US007573468B2

(12) United States Patent
Pugibet et al.

(10) Patent No.: US 7,573,468 B2
(45) Date of Patent: Aug. 11, 2009

(54) CORRECTION DEVICE FOR A DISPLAY SYSTEM

(75) Inventors: Pierre-François Pugibet, Grenoble (FR); Jérôme Chossat, Saint Marcellin (FR)

(73) Assignee: STMicroelectronics SA, Montrouge (FR)

( * ) Notice: Subject to any disclaimer, the term of this patent is extended or adjusted under 35 U.S.C. 154(b) by 880 days.

(21) Appl. No.: 10/912,763

(22) Filed: Aug. 4, 2004

(65) Prior Publication Data

US 2005/0206599 A1 Sep. 22, 2005

(30) Foreign Application Priority Data

Aug. 8, 2003 (FR) .................................. 03 50416

(51) Int. Cl.
*G06F 3/038* (2006.01)

(52) U.S. Cl. .......................... 345/204; 345/3.1; 345/87

(58) Field of Classification Search .................. 345/3.1, 345/87–100, 204
See application file for complete search history.

(56) References Cited

U.S. PATENT DOCUMENTS 6,043,797 A * 3/2000 Clifton et al. ............... 345/589
6,160,532 A 12/2000 Kaburagi et al. .............. 345/87

FOREIGN PATENT DOCUMENTS

EP 0947975 10/1999
EP 1229744 8/2002

OTHER PUBLICATIONS

French Search Report, FR0350416, May 19, 2004.

* cited by examiner

*Primary Examiner*—Richard Hjerpe
*Assistant Examiner*—Kimnhung Nguyen
(74) *Attorney, Agent, or Firm*—Lisa K. Jorgensen; Paul F. Rusyn; Graybeal Jackson LLP

(57) ABSTRACT

A device for correcting the optical response of a flat screen display system. This device comprises a gamma correction circuit of a type currently used for the correction of the optical response of cathode-ray display systems.

25 Claims, 3 Drawing Sheets

CORRECTION DEVICE FOR A DISPLAY SYSTEM

PRIORITY CLAIM

This application claims priority from French patent application No. 03/50416, filed Aug. 8, 2003, which is incorporated herein by reference.

BACKGROUND

Embodiments of the present invention relates to the correction of the optical response of display systems, and in particular, but non-exclusively, to devices enabling correction of the optical response of flat screen display systems.

The optical response of display systems is not linear. Any image signal intended to be displayed on a screen must be corrected so that the reproduced image exhibits a contrast corresponding to that of the original image.

In FIG. 1, curve 1 illustrates the optical response of a cathode-ray display system, comprising a cathode-ray screen, also called CRT screen. Curve 1 is shown in a coordinate system Ox, Oy and extends from origin O to an end point E. The coordinates of point E are $x_{max}$, $y_{max}$ and $y_{max}=x_{max}$, corresponding to the maximum value that can be taken by a pixel. On abscissa axis Ox are plotted input pixels and on ordinate axis Oy are plotted output pixels.

If a pixel P of value $x_p$ is displayed with no correction on the cathode-ray screen, the optical response of the screen is such that the displayed pixel exhibits a value $y_a$ smaller than $x_p$. For pixel P once displayed to have a value $y_p$ equal to $x_p$, a corrector circuit which modifies the value of the input pixel must be interposed between the input pixel and the display system so that, after display, the value of the displayed pixel corresponds to the value of the input pixel.

Curve 2 of FIG. 1 shows the response curve that the corrector device must exhibit to provide a correct display of the input pixels. Curve 2, which extends from origin O to end point E, is a conventional gamma correction curve very currently used to correct the response of cathode-ray screens.

Liquid-crystal display screens, or LCD screens, exhibit an optical response curve formed of two rounded lobes, called an "S" curve.

FIG. 2 shows, in a referential Ox, Oy corresponding to that of FIG. 1, the ideal response curve that a corrector device should exhibit for an LCD-type screen. This "S" curve is formed of two rounded lobes A and B, joining at an inflexion point I of coordinates $x_I$, $y_I$. It extends from origin O to an end point E of coordinates $x_{max}$ and $y_{max}=x_{max}$. The position of point I, as well as the curvature of lobes A and B, depend on the considered LCD screen.

Generally, corrector devices of flat screen display systems must exhibit rather complex response curves. "Flat screen display system" means all display systems other than those of CRT type, for example, plasma screen display systems, electroluminescent screens, liquid crystal displays, etc.

Further, if both a CRT-type display system and a flat screen display system are desired to be corrected, different corrector devices must be provided.

SUMMARY

An embodiment of the present invention provides a device for correcting the optical response of a flat screen display system having an easily-adaptable response curve.

Another embodiment of the present invention provides a corrector device enabling simple correction of the optical response of both cathode-ray tube display screens and flat screen display systems.

An embodiment of the present invention provides a device for correcting the optical response of a flat screen display system. This device comprises a gamma correction circuit of a type currently used for the correction of the optical response of cathode-ray display systems.

According to an embodiment of the present invention, the correction circuit includes a functional unit enabling application of a gamma correction function for a cathode-ray display system and a gain unit communicating with the functional unit.

According to an embodiment of the present invention, the device comprises a control circuit including a first means for providing the functional unit with a first pixel based on an input pixel; a second means for providing a gain value to the gain unit; and a third means for receiving a second pixel from the correction circuit and providing an output pixel.

According to an embodiment of the present invention, if the value of the input pixel is smaller than a first predetermined value $x_M$, the value of first pixel P1 is equal to the value of the input pixel multiplied by a multiplicative factor $x_{max}/x_M$, $x_{max}$ being the maximum value that can be taken by the input pixel and, if the value of the input pixel is greater than or equal to first predetermined value $x_M$, the value of first pixel P1 is provided by $P1=(P_{IN}-x_M)(x_{max})/(x_{max}-x_M)$.

According to an embodiment of the present invention, if the value of input pixel $P_{IN}$ is smaller than first predetermined value $x_M$, the value of output pixel $P_{OUT}$ is provided by $P_{OUT}=y_M-P4(y_M/y_{max})$, P4 being the value of a second pixel and $y_M$ being a second predetermined value and, if the value of the input pixel is greater than or equal to first predetermined value $x_M$, then the value of output pixel $P_{OUT}$ is provided by $P_{OUT}=y_M+P4(y_{max}-y_M)/y_{max}$.

According to an embodiment of the present invention, the response curve of the device is formed of two lobes respectively extending from an origin to a junction point and from the junction point to an end point, the first lobe corresponding to a curve symmetrical with respect to a straight line from the origin to the junction point of the response curve of the correction circuit reduced in size so that it extends from the origin to the junction point, and the second lobe corresponding to the response curve of the correction circuit reduced in size and offset so that it extends from the junction point to the end point.

According to an embodiment of the present invention, the first lobe is obtained by means of a first gain and the second lobe is obtained by means of a second gain different from the first gain.

According to an embodiment of the present invention, the coordinates of the junction point and/or the gain of the gain unit can be modified.

According to an embodiment of the present invention, the device further enables correction of the optical response of a cathode-ray display system.

An embodiment of the present invention provides a method for modifying the value of a pixel intended to be displayed on a flat screen display system. The method includes the steps of determining whether the pixel belongs to a predetermined input range. Then if the pixel belongs to the predetermined input range, modifying the pixel value so that the range to which it belongs corresponds to a full scale and correcting the value of the pixel thus modified by means of a gamma correction circuit of a type currently used for the correction of the optical response of cathode-ray display systems; and modifying the value of the pixel thus corrected so that it belongs to an output range associated with the predetermined input range.

BRIEF DESCRIPTION OF THE DRAWINGS

The foregoing features and advantages of the present invention will be discussed in detail in the following non-limiting description of specific embodiments in connection with the accompanying drawings.

DETAILED DESCRIPTION

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

According an embodiment of the present invention, the corrector device includes a gamma correction circuit. A portion of the device response curve is created by means of this gamma correction circuit.

Figure 1:
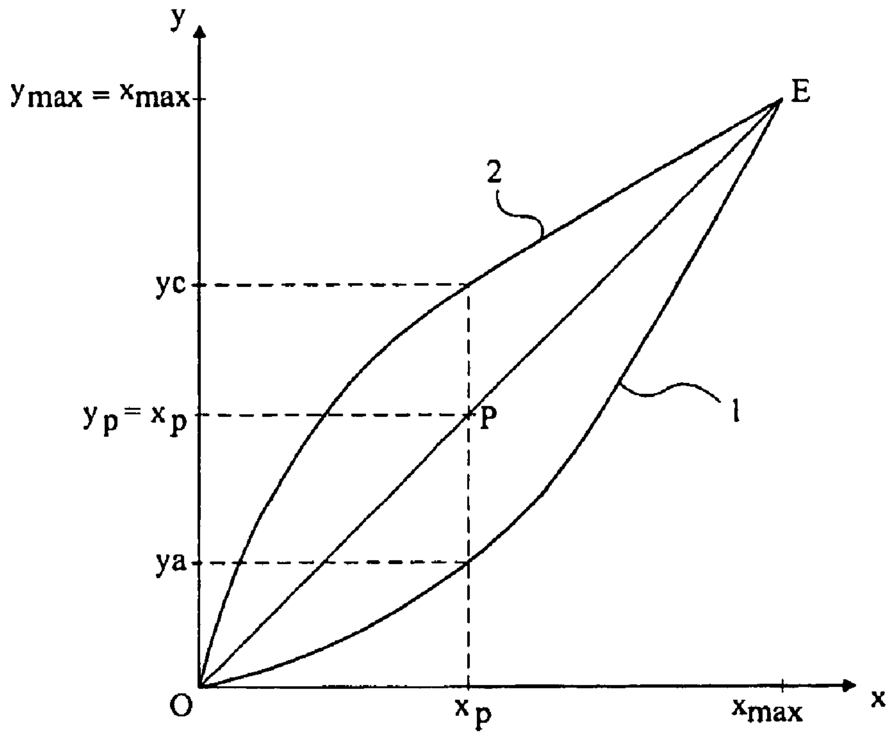
FIG. 1 illustrates the conventional correction used for a cathode-ray screen.
Figure 2:
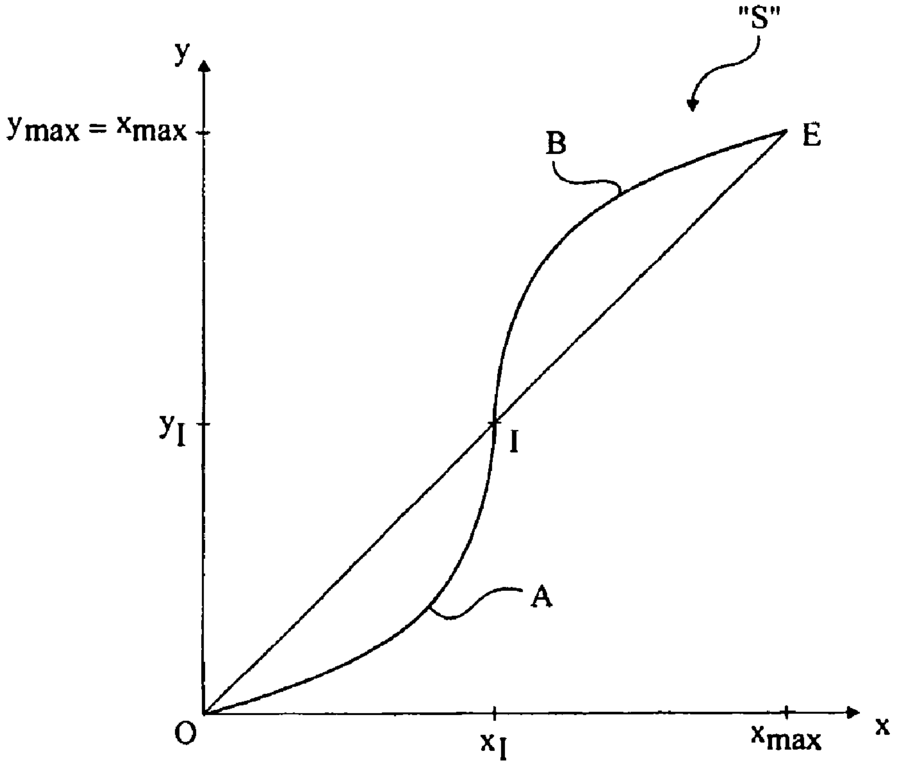
FIG. 2 shows an ideal correction curve for an LCD-type screen.

The forming of a response curve of a corrector device according to certain embodiments of the present invention will now be explained by means of FIGS. 3A to 3F in the specific case where a response curve of a type similar to the "S" curve of FIG. 2 is desired to be obtained. Referential Ox, Oy, points O and E, values xmax and ymax of the diagrams of FIGS. 3A to 3F correspond to the elements of the same reference numerals of FIGS. 1 and 2, and will not be discussed any further.

Figure 3A:
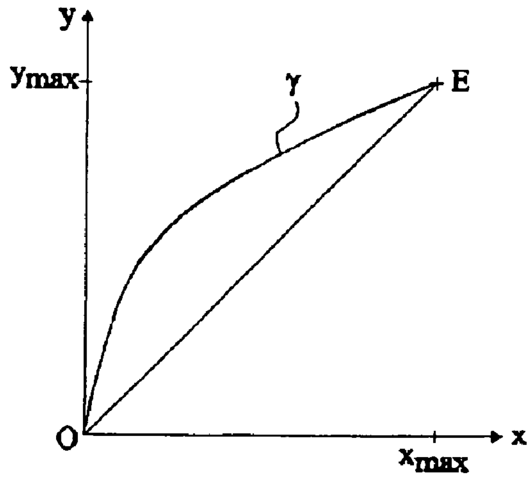
FIGS. 3A to 3F are diagrams illustrating a way to obtain a response curve of a corrector device according to an embodiment of the present invention.

FIG. 3A shows a standard type γ curve currently used for the correction of the optical response of cathode-ray display systems. The γ curve extends from an origin O to an end point E, of coordinates $x_{max}$ and $y_{max}$, and corresponds to curve 2 of FIG. 1. The γ curve will be used as follows to form the two lobes A and B of the desired "S" curve.

Figure 3B:
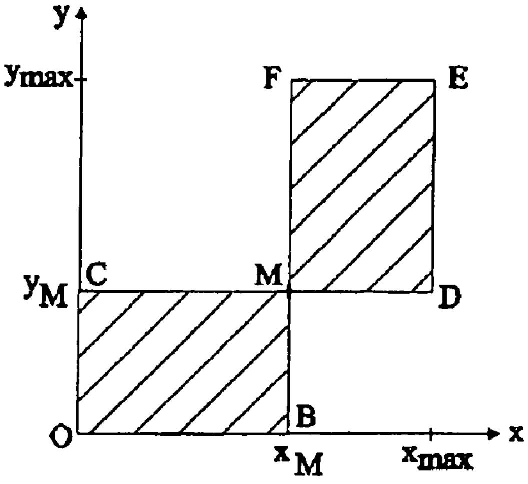

In FIG. 3B, a point M of coordinates $x_M$ and $y_M$ is first selected. Point M is intended to be the junction point of the two lobes A and B of the response curve. In the most general case, ordinate $y_M$ of point M is different from its abscissa $x_M$. Lobe A must extend from points O to M, and be within rectangle OBMC, the coordinates of points B and C being respectively $(x_M,0)$ and $(0,y_M)$. Lobe B must extend from points M to E, and be within rectangle MDEF such that the coordinates of points D and F are respectively $(x_{max}, y_M)$ and $(x_M, y_{max})$.

Figure 3C:
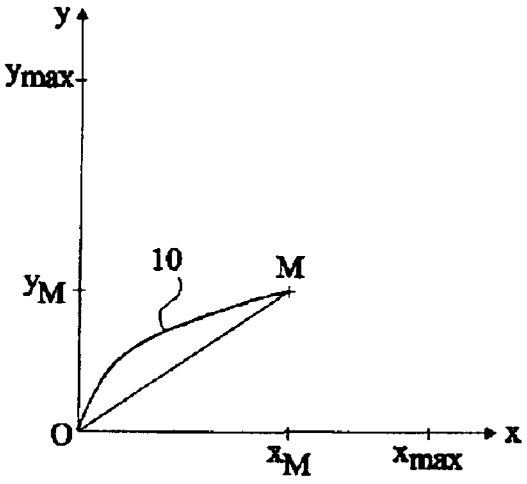

In FIG. 3C, a curve 10 extends from origin O to point M. Curve 10 is derived from the γ curve of FIG. 3A by size reduction to be contained within rectangle OBMC of FIG. 3B. As will be seen hereafter, to obtain curve 10, in addition to the size reduction, a modification of the γ curve of FIG. 3A may be performed, for example, by means of a multiplicative factor, to increase or decrease its curvature.

Figure 3D:
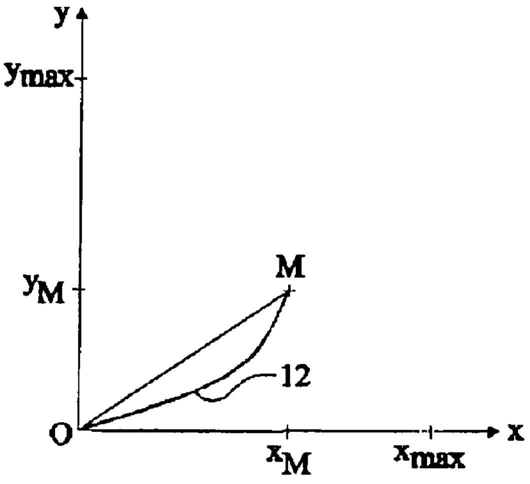

In FIG. 3D, a curve 12 has been shown. Curve 12 is obtained by symmetry of curve 10 with respect to the midpoint of segment OM and is intended to form a first lobe A of the device response curve.

Figure 3E:
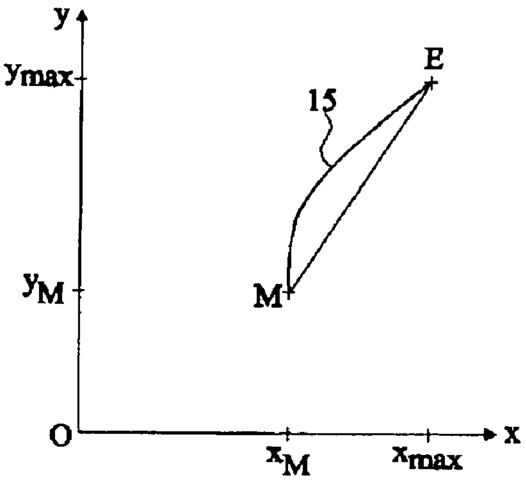

In FIG. 3E, a curve 15 extends from point M to end point E. Curve 15 derives from curve γ of FIG. 3A by size reduction and offset so that it takes up rectangle MDEF of FIG. 3B. To obtain curve 15, in addition to a size reduction and an offset, a modification of curve γ of FIG. 3A may be performed to increase or decrease its curvature.

Figure 3F:
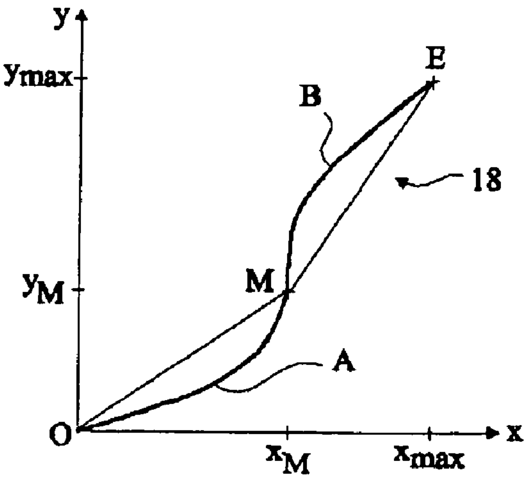

In FIG. 3F, curve 12 of FIG. 3B and curve 15 of FIG. 3E are gathered to respectively form first lobe A and a second lobe B of a response curve 18 of a corrector device according to an embodiment of the present invention. Curve 18, shown in bold lines in FIG. 3F, substantially corresponds to the ideal "S" curve of FIG. 2. Curve 18 is a continuous smooth curve and junction point M is similar to an inflexion point.

The response curve of a device according to an embodiment of the present invention can be adapted to any flat screen, be it of LCD type or not.

Coordinates $x_M$ and $y_M$ are parameters that can be modified and point M may be chosen in any appropriate fashion. The curvature of each of lobes A and B may be chosen and modified individually by modification of the basic γ curve, for example by means of a specific gain.

It should be noted that the response curve of the corrector device may also comprise more than two lobes, each lobe being defined from the standard γ curve between two specific points. Also, the device response curve may comprise one or several rectilinear portions, if desired. The response curve of the corrector device according to an embodiment of the present invention may also comprise a single lobe obtained by means of the standard γ curve, and for example one or several linear portions, or of another correction type.

In practice, to determine the response curve of the corrector device according to an embodiment of the present invention, it is started from the optical response of the display system to be corrected. The ideal response curve of the corrector device is defined and portions that can be represented by the standard γ curve, after possible transformations such as a modification by a multiplicative factor, a downscaling, translations, symmetries, rotations, etc., are determined therein. The portions thus defined are limited by junction points which delimit specific ranges for the input signal. According to the specific range to which it belongs, the input signal will undergo adequate processing so that an output signal corresponding to the desired correction is provided.

The corrector device according to an embodiment of the present invention is formed according to the desired response curve which, as it should be reminded, comprises at least one portion derived from a gamma correction curve of a type currently used for the correction of the optical response of a cathode-ray display system. Since the response curve may be extremely varied, the structure of the corrector device according to an embodiment of the present invention may also significantly vary.

Figure 4:
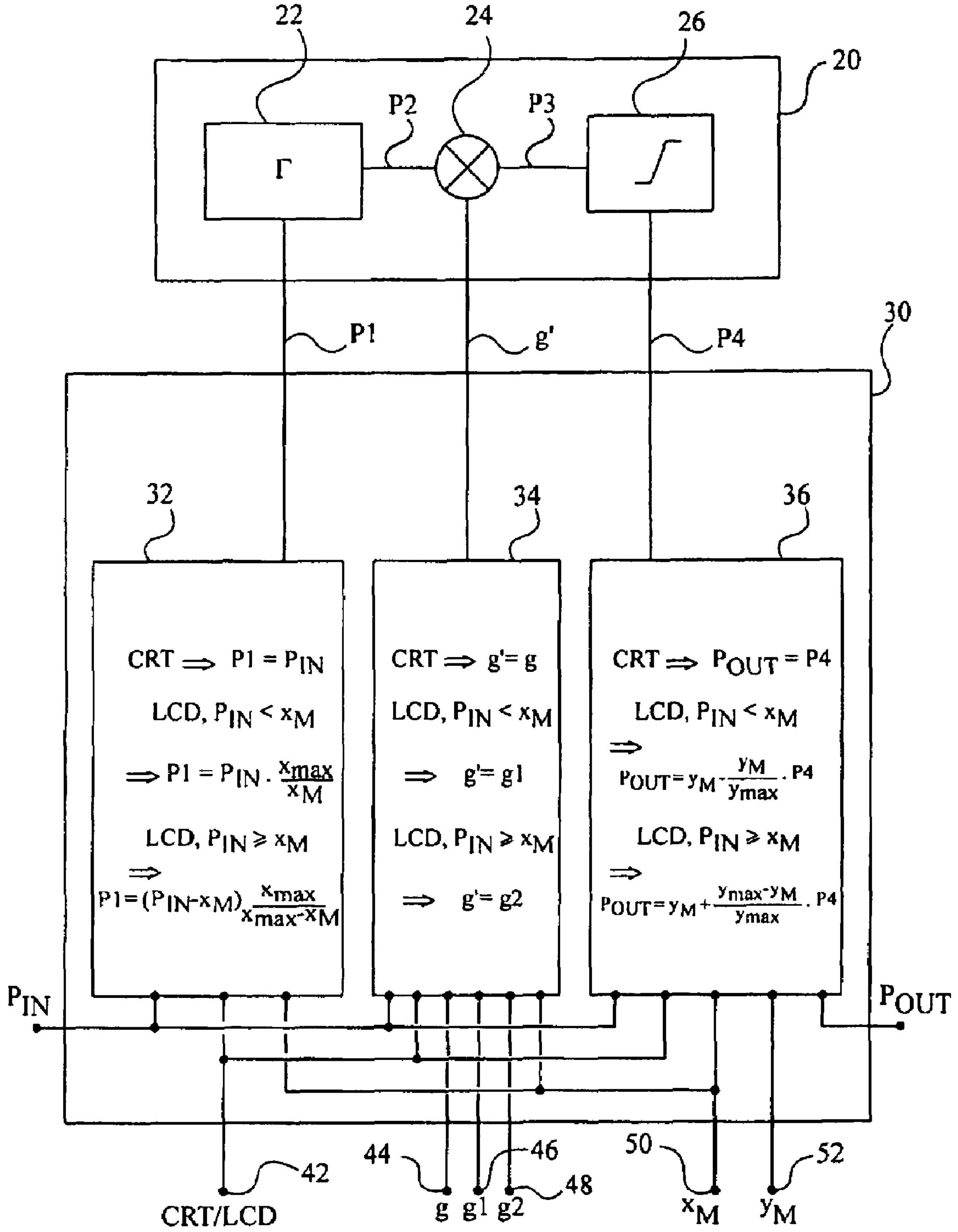
FIG. 4 shows an embodiment of a corrector device according to the present invention.

FIG. 4 illustrates a corrector device according to an embodiment of the present invention enabling correction of signals intended to be displayed either on a cathode-ray screen, or on an LCD-type flat screen.

This embodiment is such that, when the signals are intended to be displayed on a CRT-type screen, they undergo a correction hereafter said to be of standard gamma type of the type illustrated in FIG. 3A When the signals are intended to be displayed on an LCD-type screen, they undergo an S correction of the type illustrated in FIG. 3F. The signals to be corrected appear in the form of input pixels of values ranging between 0 and a maximum value $x_{max}$.

The corrector device comprises a correction circuit 20 and a control circuit 30. Correction circuit 20 is a circuit enabling a standard gamma-type correction, that is, a correction of a type currently used for the correction of the optical response of cathode-ray display systems.

In the example shown, correction circuit 20 includes a functional unit 22 enabling application of a conventional gamma correction function Γ for a CRT-type screen. This function for example corresponds to the elevation of the value of the received pixel to power 0.45. Correction circuit 20 also comprises a gain unit 24 for applying a multiplicative factor to the signal provided by functional unit 22, and a dipping unit 26 enabling dipping of the signal provided by gain unit 24.

Control device 30 comprises units 32, 34, and 36.

Unit 32 receives an input pixel $P_{IN}$ and provides a pixel P1 to functional unit 22. Functional unit 22 applies function Γ to pixel P1, which results in a pixel P2=Γ(P1). Pixel P2 is provided to gain unit 24. Gain unit 24 further receives a gain g' from unit 34 and provides a pixel P3 corresponding to pixel P2 multiplied by g'. Unit 26 dips pixel P3 if its value is greater than the maximum value $y_{max}=x_{max}$ allowed for the pixels and provides a pixel P4 to unit 36. Unit 36 provides, from pixel P4, an output pixel $P_{OUT}$ intended for the display.

An input terminal 42 is provided to receive an indicator CRT/LCD enabling discrimination of whether a display on a cathode-ray screen or on a flat screen is desired. For example, indicator CRT/LCD may be equal to 1 if the image signal is to be displayed on a CRT-type screen, and equal to 0 if the image signal is to be displayed on an LCD-type screen.

Signals on gain input terminals 44, 46, and 48 respectively determine a gain g for the cathode-ray screen correction, a gain g1 for obtaining a first lobe A of the S curve, and a gain g2 for obtaining a second lobe B of the S curve. Signals on terminals 50 and 52 respectively determine abscissa $x_M$ and ordinate $y_M$ of junction point M.

Indicator CRT/LCD is provided to each of units 32, 34, and 36 via adequate connections. Gains g, g1, and g2 are provided to unit 34. Abscissa $x_M$ is provided to each of units 32, 34, 36 and ordinate $y_M$ is provided to unit 36. Input pixel $P_{IN}$ is further provided to units 34 and 36.

The operation of the corrector device of FIG. 4 will now be explained.

In CRT mode, where the input pixel is intended to be displayed on a cathode-ray tube or CRT screen, unit 32 transmits input pixel $P_{IN}$ to functional unit 22 without any modification. Pixel P1 is thus identical to pixel $P_{IN}$. Unit 34 provides gain unit 24 with a gain g' equal to gain g received via terminal 44. Thus, pixel P2, which corresponds to pixel P1 to which function Γ has been applied, turns into a pixel P3 equal to g×(P2). Unit 26 provides a pixel P4 corresponding to pixel P3, dipped if need be, any value of P3 exceeding the maximum admissible value. Unit 36 provides an output pixel $P_{OUT}$ identical to pixel P4.

Thus, in CRT mode, control circuit 30 modifies neither the input pixel, nor the pixel provided by correction circuit 20, the used gain g being specific to the considered cathode-ray screen.

In LCD mode, unit 32 first examines whether input pixel $P_{IN}$ must be corrected by means of the first or of the second lobe of the device response curve.

If the value of the input pixel is smaller than $x_M$, unit 32 provides a pixel P1=$(P_{IN})(x_{max})/x_M$. This corresponds to a scale change having input range 0-$x_M$, to which the input pixel belongs, correspond to full scale 0-$x_{max}$. Function Γ of unit 22 is thus applied to a pixel P1 that can vary from 0 to $x_{max}$, as in CRT mode.

If the value of the input pixel is greater than or equal to $x_M$, unit 32 provides pixel P1=$(P_{IN}-x_M)(x_{max})/(x_{max}-x_M)$. Here again, range $x_M$-$x_{max}$ to which the input pixel belongs is modified to correspond to a full scale, and function Γ of unit 22 applies again to a pixel P1 likely to vary from 0 to $x_{max}$.

In LCD mode, when the value of input pixel $P_{IN}$ is smaller than $x_M$, unit 34 provides a gain value g'=g1, so that lobe A of the response curve exhibits the desired curvature. When the value of input pixel $P_{IN}$ is greater than or equal to $x_M$, unit 34 provides a gain value g'=g2, so that lobe B of the response curve exhibits the desired curvature.

Unit 36 processes pixel P4 received from correction circuit 20 to provide an output pixel $P_{OUT}$ which corresponds to the response curve desired for the device. When $P_{IN}$ is smaller than $x_M$, unit 36 performs a scale change so that the range of the output pixel extends from 0 to $y_M$, as well as an operative processing to take account of the symmetry with respect to straight line OM illustrated in FIG. 3D. Eventually, $P_{OUT}$=$(y_M-P4)(y_M/y_{max})$ Similarly, when $P_{IN}$ is greater than $x_M$, pixel P4 is processed by unit 36 to provide an output pixel $P_{OUT}$ corresponding to the desired correction. This corresponds in this case to a scale change so that pixel P4 belongs to output range $y_M$-$y_{max}$, which corresponds to input range $x_M$-$x_{max}$. The expression of $P_{OUT}$ is $P_{OUT}$=$(y_M+P4)(y_{max}-y_M)/y_{max}$.

It should be noted that it is not necessary for units 22, 32, and 36 to provide results of great accuracy and relatively simpler operators may be used.

It should be noted that the device of FIG. 4 is advantageous in that it enables correcting in simple fashion both signals for display on a CRT-type screen and signals for display on an LCD-type screen, without requiring two distinct corrector devices.

Of course, embodiments of the present invention are likely to have various alterations, modifications, and improvements which will readily occur to those skilled in the art.

In particular, the structure of the corrector device according to an embodiment of the present invention may significantly differ from the example of the embodiment shown in FIG. 4. For example, if the device is only used for flat screen correction, the portion relating to the CRT processing can be suppressed.

Also, if the device is only used for the correction of a specific flat screen, the parameters specific to this screen (gains of the lobe(s), coordinates of the junction points) may be stored internally to the device and not be accessible to the user.

Also, an embodiment according to the present invention may be used for other purposes than the gamma correction. For example, the device response curve may be chosen to have a rendering of the reproduced image different from the original image. For example, the image contrast may be modified, specific optical effects may be produced, or the color rendering may be modified in the case of a color display. It should be noted that, in the case of a color display, an embodiment according to the present invention primary color may be used, each device having or not a response curve independent from the others.

The input signal of the corrector device may be formed of a sequence of digital or analog samples or of a continuously-varying analog signal, with the application of a sampling or an analog-to-digital conversion of the output signal of the device if need be. Also, maximum value $y_{max}$ of the output signal of the device does not necessarily need to be identical to maximum value $x_{max}$ of the input signal.

The corrector device according to an embodiment of the present invention may apply to many fields. For example, devices according to an embodiment of the present invention may be used to correct or modify the optical response of displays of digital photographic devices of mobile phones, etc.

The embodiment of FIG. 4 of the device according to an embodiment of the present invention is particularly advantageous for example in the case of a mobile phone equipped with a small liquid crystal flat screen for a direct vision of images, and comprising a tap enabling connection to a cathode-ray tube screen, for example of a computer or of a television set.

Also, the device according to an embodiment of the present invention may for example be adapted to correct several different types of flat screens, for example the flat screen of a mobile phone or of a digital photographic device and the flat screen of a computer, the device storing all the parameters necessary to the correction of the various considered screens.

From the foregoing it will be appreciated that, although specific embodiments of the invention have been described herein for purposes of illustration, various modifications may be made without deviating from the spirit and scope of the invention.

What is claimed is:

1. A device for correcting the optical response of a flat screen display system, comprising a gamma correction circuit of a type currently used for the correction of the optical response of cathode-ray display systems, wherein the response curve of the device is formed of two lobes respectively extending from an origin to a junction point and from the junction point to an end point, the first lobe corresponding to a curve symmetrical with respect to a straight line from the origin to the junction point of the response curve of the correction circuit reduced in size so that it extends from the origin to the junction point, and the second lobe corresponding to the response curve of the correction circuit reduced in size and offset so that it extends from the junction point to the end point.

2. The device of claim 1, wherein the correction circuit comprises a functional unit enabling application of a gamma correction function for a cathode-ray display system and a gain unit coupled to the functional unit.

3. The device of claim 2, further comprising a control circuit having:

a first means for providing the functional unit with a first pixel based on an input pixel;

a second means for providing a gain value to the gain unit; and a third means for receiving a second pixel from the correction circuit and providing an output pixel.

4. The device of claim 3, wherein, if the value of the input pixel is smaller than a first predetermined value, the value of the first pixel is equal to the value of the input pixel multiplied by a multiplicative factor being the maximum value that can be taken by the input pixel and, if the value of the input pixel is greater than or equal to predetermined value, the value of the first pixel is provided by:

$$P1=(P_{IN}-x_M).x_{max}/(x_{max}-x_M).$$

5. The device of claim 4, wherein, if the value of input pixel is smaller than predetermined value, the value of output pixel is provided by $P_{OUT}=y_M-P4(y_M/y_{max})$, the value of said second pixel and $y_M$ being a second predetermined value and, if the value of the input pixel is greater than or equal to predetermined value, the value of output pixel is provided by $P_{OUT}=y_M+P4(y_{max}-y_M)/y_{max}$.

6. The device of claim 1, wherein the first lobe is obtained by means of a first gain and the second lobe is obtained by means of a second gain different from the first gain.

7. The device of claim 1, wherein the coordinates of the junction point and/or the gain of the gain unit can be modified.

8. The device of claim 1, further enabling correction of the optical response of a cathode-ray display system.

9. A method for modifying the value of a pixel intended to be displayed on a flat screen display system, comprising the steps of:

determining whether the pixel belongs to a predetermined input range; and if the pixel belongs to the predetermined input range:

modifying the pixel value so that the range to which it belongs corresponds to a full scale;

correcting the value of the pixel thus modified by means of a gamma correction circuit of a type currently used for the correction of the optical response of cathode-ray display systems; and modifying the value of the pixel thus corrected so that it belongs to an output range associated with the predetermined input range.

10. A correction circuit for correcting input pixel signals to be displayed on a CRT-type display or a flat screen type display, the correction circuit adapted to receive a display type indicator signal indicating the type of display on which the input pixel signals are to be displayed and the correction circuit operable in a CRT mode responsive to the display type indicator signal being active to apply a gamma correction function to the input pixel signals to generate an output pixel signal corrected for display on a CRT, and operable in a flat-screen mode responsive to the display type indicator signal being inactive to apply a flat screen correction to the input signals to generate an output pixel signal corrected for display on a flat screen, the flat screen correction function further being derived from the gamma correction function.

11. The correction circuit of claim 10 wherein the flat-screen type display comprises a liquid crystal display.

12. The correction circuit of claim 11 wherein the gamma correction function comprises a conventional CRT gamma correction function and wherein the flat-screen correction function comprises an S-type correction function.

13. A correction circuit for correcting input pixel signals to be displayed on a CRT-type display or a flat screen type display, the correction circuit adapted to receive a display type indicator signal indicating the type of display on which the input pixel signals are to be displayed and the correction circuit operable in a CRT mode responsive to the display type indicator signal being active to apply a gamma correction function to the input pixel signals to generate a CRT corrected output pixel signal, and operable in a flat-screen mode responsive to the display type indicator signal being inactive to apply a flat screen correction to the input signals to generate a flat screen corrected output pixel signal, the flat screen correction function further being derived from the gamma correction function, the correction circuit further comprising:

a control circuit adapted to receive an input pixel signal and display control signals including the display type indicator signal, the control circuit operable to generate a scaled pixel signal from the input pixel signal and to generate a gain signal responsive to the display control signals and a value of the input pixel signal, and operable to receive a gamma corrected pixel signal and to generate the corrected output pixel signal from the gamma corrected pixel signal responsive to the display control signals and the value of the input pixel signal; and a gamma correction circuit coupled to the control circuit to receive the scaled pixel signal and the gain signal, the gamma correction circuit operable to generate the gamma corrected pixel signal from the scaled pixel signal with the gamma corrected pixel signal having a value that is a function of the gain signal.

14. The correction circuit of claim 13 wherein the display control signals include the display type indicator signal and further include a plurality of gain signals and coordinate signals having values corresponding to an inflexion point of the flat screen correction function.

15. The correction circuit of claim 14 wherein the control circuit further comprises an input control unit coupled to receive the input pixel signal, the input control unit operable to output the input pixel signal as the scaled pixel signal responsive to the display type indicator signal being active, and operable to provide the scaled pixel signal having a value determined by a first scaling function responsive to the display type indicator signal being inactive and the input pixel signal having a value less than an inflexion value, and operable to provide the scaled pixel signal having a value determined by a second scaling function responsive to the display type indicator signal being inactive and the input pixel signal having a value equal to or greater than the inflexion value.

16. The correction circuit of claim 15 wherein the gamma correction circuit further comprises a clipping circuit operable to limit values of the gamma corrected pixel signal.

17. The correction circuit of claim 14 wherein the control circuit further comprises an output control unit coupled to receive the gamma corrected pixel signal, the output control unit operable to output the gamma corrected pixel signal as the corrected output pixel signal responsive to the display type indicator signal being active, and operable to provide the corrected output pixel signal having a value determined by a first scaling function responsive to the display type indicator signal being inactive and the gamma input pixel signal having a value less than an inflexion value, and operable to provide the corrected output pixel signal having a value determined by a second scaling function responsive to the display type indicator signal being inactive and the input pixel signal having a value equal to or greater than the inflexion value.

18. The correction circuit of claim 14 wherein the control circuit further comprises a gain control unit coupled to receive the gain signals, with the gain signals comprising a CRT gain signal, a first lobe gain signal, and a second lobe gain signal, and wherein the gain control circuit is operable to apply the CRT gain signal to the gamma correction circuit responsive to the display type indicator signal being active, is operable to apply the first lobe gain signal to the gamma correction circuit responsive to the display type indicator signal being inactive and the input pixel signal being less than an inflexion value, and operable to apply the second lobe gain signal to the gamma correction circuit responsive to the display type indicator signal being inactive and the input pixel signal being greater than or equal to the inflexion value.

19. An electronic system, comprising:

a correction circuit for correcting input pixel signals to be displayed on a CRT-type display or a flat screen type display, the correction circuit adapted to receive a display type indicator signal indicating the type of display on which the input pixel signals are to be displayed and the correction circuit operable in a CRT mode responsive to the display type indicator signal being active to apply a gamma correction function to the input pixel signals to generate an output pixel signal corrected for display on a CRT, and operable in a flat-screen mode responsive to the display type indicator signal being inactive to apply a flat screen correction function to the input signals to generate an output pixel signal corrected for display on a flat screen, the flat screen correction function further being derived from the gamma correction function; and a display coupled to the correction circuit to receive the flat-screen corrected output pixel signal.

20. The electronic system of claim 19 wherein the system comprises a mobile phone or a digital photographic device.

21. The electronic system of claim 20 wherein the display comprises a liquid crystal display.

22. A method for modifying the value of a pixel to be displayed on a display system, comprising:

detecting whether the pixel is to be displayed on a CRT-type or flat screen type display system;

when the operation of detecting indicates the pixel is to be displayed on a CRT-type display system, applying a gamma correction function to generate a gamma corrected value for the pixel; and when the operation of detecting indicates the pixel is to be displayed on a flat screen type display system, deriving a flat screen correction function from the gamma correction function, and applying the flat screen correction function to generate a flat screen corrected value for the pixel.

23. The method of claim 22 wherein the gamma correction function comprises a conventional CRT gamma correction function and wherein the flat screen correction function comprises an S-type correction function.

24. The method of claim 22 wherein applying a flat screen correction function that includes the gamma correction function to generate a flat screen corrected value for the pixel comprises:

scaling the value of the input pixel prior to applying the gamma correction function to generate a scaled pixel, the scaling being a function of the detected type of display system and a value of the input pixel;

multiplying the scaled pixel by a gain to generate a multiplied pixel, a value of the gain being a function of the detected type of display system, at least one external gain signal, and the value of the input pixel; and generating a flat screen corrected value for the pixel from the multiplied pixel, the flat screen corrected value being a function of the detected type of display system and the value of the input pixel.

25. The method of claim 24 further comprising limiting a value of the multiplied pixel.

* * * * *

UNITED STATES PATENT AND TRADEMARK OFFICE

CERTIFICATE OF CORRECTION

PATENT NO. : 7,573,468 B2 Page 1 of 1
APPLICATION NO. : 10/912763
DATED : August 11, 2009
INVENTOR(S) : Pierre-Francois Pugibet et al.

It is certified that error appears in the above-identified patent and that said Letters Patent is hereby corrected as shown below:

- In Column 1, Line 12 of the patent, please change the text “relates” to --relate--.

Signed and Sealed this

Sixth Day of October, 2009

David J. Kappos

David J. Kappos
*Director of the United States Patent and Trademark Office*